United States Patent [19]
Endoh et al.

[11] Patent Number: 4,673,724
[45] Date of Patent: Jun. 16, 1987

[54] POLYMERIC WHISKER AND PRODUCTION OF THE SAME

[75] Inventors: Seiji Endoh; Kunio Kimura; Toshihiko Ohta, all of Ohtsu; Yasuo Kato, Shiga, all of Japan

[73] Assignee: Toyo Boseki Kabushiki Kaisha, Osaka, Japan

[21] Appl. No.: 804,419

[22] Filed: Dec. 4, 1985

[30] Foreign Application Priority Data

Dec. 7, 1984 [JP] Japan .................................. 59-259585
May 27, 1985 [JP] Japan .................................. 60-113868
May 31, 1985 [JP] Japan .................................. 60-119017

[51] Int. Cl.$^4$ ........................ C08G 63/06; C08G 65/38
[52] U.S. Cl. ................................................... 528/206
[58] Field of Search ......................................... 528/206

[56] References Cited

U.S. PATENT DOCUMENTS

| | | | |
|---|---|---|---|
| 3,974,250 | 8/1976 | Cottis et al. ................... | 528/106 X |
| 4,184,996 | 1/1980 | Calundann ..................... | 528/206 X |
| 4,267,304 | 5/1981 | Feasey et al. ................. | 528/193 |
| 4,355,134 | 10/1982 | Charbonneau et al. ........... | 524/605 |
| 4,429,104 | 1/1984 | Feasey ......................... | 528/206 |

*Primary Examiner*—Lucille M. Phynes

[57] ABSTRACT

A crystalline polymeric whisker comprising repeating units derived from a compound selected from the group consisting of p-oxybenzoyl and 2-oxy-6-naphthoyl, which has high elasticity and tenacity as well as good heat resistance.

16 Claims, 11 Drawing Figures

POLYMERIC WHISKER AND PRODUCTION OF THE SAME

FIELD OF THE INVENTION

The present invention relates to a polymeric whisker and a process for preparing the same. More particularly, it relates to a polymeric whisker comprising crystalline poly(p-oxybenzoyl) or poly(2-oxy-6-naphthoyl). The polymeric whisker has high crystallinity so that it can be used as a reinforcement with high elasticity and tenacity.

BACKGROUND OF THE INVENTION

Recently, composite material has been recognized as one of the high performance materials, and as a reinforcement for the composite material, there have been developed graphite fibers and wholly aromatic polyamide fibers such as poly(p-phenyleneterephthalamide) fibers, which have high elasticity and tenacity. These reinforcing fibers are, however, long fibers so that they reinforce the composite material only in one direction. To reinforce the composite material in at least two directions, at least two sheets of the composite material having different reinforcing directions should be laminated. In addition, it is difficult to isotropically reinforce the composite material with conventional reinforcement fibers. Consideration can be given to cutting the long fiber to produce short fibers. However, it is impossible to produce a short fiber having a length of about 100 μm or less. These drawbacks can be overcome by use of a polymeric whisker, the fiber length of which can be adjusted by controlling the deposition rate of the crystal. Hitherto, as an organic polymeric whisker, only the poly(oxymethylene) whisker is known. The poly(oxymethylene) whisker is prepared by a method comprising ionic ring opening polymerization of trioxane in hexane and simultaneous precipitation of a produced polymer. Although the whisker having a length of 30 to 150 μm and a diameter of 1 to 3 μm is obtained, its melting point is as low as 183 to 185° C. Therefore, it finds very few applications, for example as, a reinforcement of material used as a speaker cone.

As one of organic polymers having high melting points, poly(p-oxybenzoyl) is known and prepared by heating p-acetoxybenzoic acid in a heating medium (cf. J.P.S., Polymer Letters Ed., 22, 433 (1984)). The polymeric crystal produced by this process is, however, of a cylindrical or flat-plate shape, which does not have a sufficiently large ratio of length and diameter to be used as reinforcement for composite material.

It has been reported that a fibril form polymer was produced by polymerizing p-acetoxybenzoic acid in a heating medium under specific conditions (cf. Polymer Preprints, Japan, 32(4), 848). The obtained fibril form polymer has not been used as the reinforcement of the composite material since fibrils tend to intertangle with each other and cannot be thoroughly dispersed in a matrix polymer to be reinforced.

Production of poly(2-oxy-6-naphthoyl) has not been reported.

SUMMARY OF THE INVENTION

One object of the present invention is to provide a novel crystalline polymeric whisker, which has a high melting point and can be used as a reinforcement for composite material.

Another object of the present invention is to provide a process for preparing an organic crystalline polymer in a whisker form.

According to one aspect of the present invention, there is provided a crystalline polymeric whisker comprising repeating units derived from a compound selected from the group consisting of p-oxybenzoyl and 2-oxy-6-naphthoyl.

DETAILED DESCRIPTION OF THE INVENTION

Figure 1:
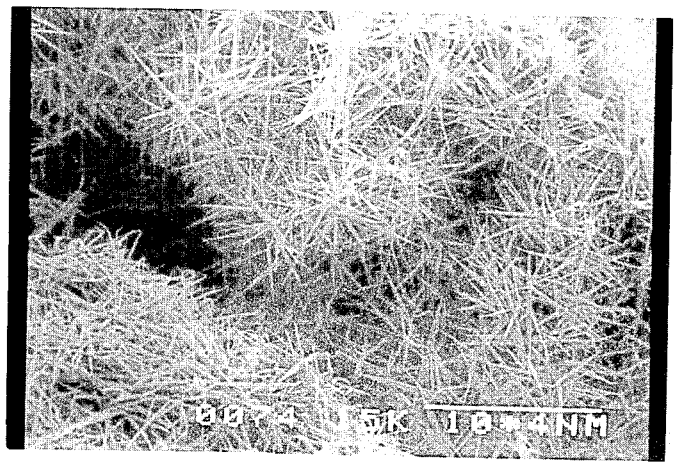
FIG. 1 is an electron microscope photograph (300×magnification) of a crystalline whisker of poly(p-oxybenzoyl) prepared in Example 1.

Generally, a whisker is defined as a substantially single crystal of a whisker shape. This definition is, however, applied to an inorganic whisker. The organic polymeric whisker has a different definition that it is highly crystalline and has a length to diameter ratio larger than a specific value. Namely, the organic polymeric whisker is defined as a crystalline polymer having a length (L) of 6 to 200 μm, preferably 10 to 200 μm, more preferably 20 to 200 μm; a diameter (D) of 0.2 to 5 μm: a L/D ratio of not smaller than 10; and crystallinity of not smaller than 85% measured by X-ray diffraction analysis.

The polymeric whisker of the invention is preferably prepared by, for example, the following process:

A p-oxybenzoyl compound of the formula:

(I)

wherein $R^1$ is a hydrogen atom or a group of the formula:

$R^3$—CO— in which $R^3$ is a $C_1$–$C_4$ alkyl group or a phenyl group optionally substituted with 1 to 3 methyl groups and $R^2$ is a hydrogen atom or a phenyl group optionally substituted with 1 to 3 methyl and/or ethyl groups with the proviso that one of $R^1$ and $R^2$ is a hydrogen atom and the other of them is not a hydrogen atom, or a 2-oxy-6-naphthoyl compound of the formula:

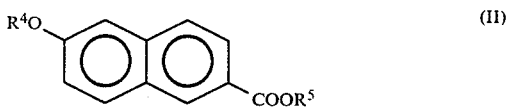

wherein $R^4$ is a hydrogen atom or a group of the formula:

in which $R^6$ is a $C_1$–$C_4$ alkyl group or a phenyl group optionally substituted with 1 to 3 methyl groups and $R^5$ is a hydrogen atom or a phenyl group optionally substituted with 1 to 3 methyl and/or ethyl groups with the proviso that one of $R^4$ and $R^5$ is a hydrogen atom and the other of them is not a hydrogen atom is added to a solvent which is unreactive with the compound (I) or (II) and in which the produced polymer is hardly or not soluble in a concentration of 0.3 to 4.5% by weight as converted to the polymer weight, and then polymerized at a temperature not lower than 265° C. without stirring or with stirring at a low rate.

Specific examples of the compound (I) are p-acetoxybenzoic acid, p-propoyloxybenzoic acid, p-benzoyloxybenzoic acid, p-toluyloxybenzoic acid, phenyl p-hydroxybenzoate, cresyl p-hydroxybenzoate and the like. Specific examples of the compound (II) are 2-acetoxy-6-naphthoic acid, 2-propoyloxy-6-naphthoic acid, 2-benzoyloxy-6-naphthoic acid, 2-toluyloxy-6-naphthoic acid and the like. Among them, p-acetoxybenzoic acid and 2-acetoxy-6-naphthoic acid are preferred.

Since the polymerization is carried out at a temperature not lower than 265° C., the solvent preferably has a boiling point not lower than 270° C. In the solvent, the produced poly(p-oxybenzoyl) or poly(2-oxy-6-naphthoyl) is dissolved in a concentration not larger than 0.3% by weight. A solvent having a reactive site, such as reactive hydrogen in a molecule is not preferred, since the produced polymer decomposes in such solvent. Specific examples of the solvent to be used according to the present invention are aromatic compounds (e.g. diisopropylnaphthalene, diethylnaphthalene, ethylisopropylnaphthalene, cyclohexyldiphenyl and diethyldiphenyl) and paraffins having a boiling point of not lower than 270° C. The solvent preferably has a flow point of not lower than 190° C. Among them, the paraffins are preferred.

The concentration of the monomer in the solvent should be kept in a range of 0.3 to 4.5% by weight as converted to the polymer weight. So long as this range is maintained, the monomer may be added in the solvent as the produced polymer precipitates.

The reaction is carried out at a temperature not lower than 265° C. When the reaction temperature is lower than 265° C., and polymeric whisker is produced. As the reaction temperature is raised, the precipitation rate of the crystalline whisker increases. However, at a temperature higher than 350° C., the precipitation rate is not significantly increased, but a reactor and other equipment used are corroded. Preferred reaction temperatures range from 275 to 350° C. When the boiling point of the solvent is lower than the lower limit of the reaction temperature, the reaction is carried out under pressure. In this case, formed acid should be removed from the reaction system.

The reaction is carried out without stirring or with slightly stirring at a rate of not greater than 20 rpm. The reaction mixture may be stirred before the precipitation starts. When the reaction mixture is stirred at a high rate during precipitation, not only is the yield of the polymer decreased but also the polymer precipitates in a fibril form and no crystalline whisker is produced.

For example, the crystalline whisker of poly(p-oxybenzoyl) produced according to the present invention has amorphous index of 2.0 or less. The an amorphous index is calculated by following equation:

$$\text{Amorphous index} = 100 - (\rho/1.52) \times 100$$

wherein $\rho$ is a density of the crystal measured by the sinkfloat method and 1.52 is the theoretical density of the poly(p-oxybenzoyl).

The polymeric whisker of the invention has good tensile, tenacity and heat resistance. It is used as a reinforcement of composite material, which can isotropically reinforce the composite material.

The polymeric whisker of the invention may be compounded with other matrix polymer of the composite material by a conventional method. For example, the whisker is melt blended with a melt moldable polymer and molded to form the composite material. Alternatively, the matrix polymer is dissolved in a dispersion of the whisker in a suitable solvent, and then the solvent is removed to form the composite material. The amount of the whisker to be added in the matrix polymer is not critical. However, when too large an amount of the whisker is added, thorough dispersion of the whisker and mixing of the matrix polymer are necessary to intimately adhere the whisker to the polymer. The amount of the whisker contained in the composite material is usually from 1 to 90% by weight, preferably from 1 to 80% by weight.

The matrix polymer of the composite material may be an organic or inorganic one which is not a crystalline whisker. Specific examples of the organic matrix polymer are linear polymers such as polyolefins (e.g. polyethylene), polyesters (e.g. poly(ethyleneterephthalate) and poly(isopropylidenediphenyl tere- and/or isophthalate), polyamides (e.g. polycapramide and poly(m-phenyleneisophthalamide)), polycarbonates and polysulfones; and thermosetting polymers such as epoxy resins, unsaturated polyester resins and polyimide resins. Specific examples of the inorganic polymers are silicone resins.

The crystalline whisker may be subjected to a surface treatment such as corona discharge or alkali etching.

The present invention will be hereinafter explained further in detail by the following examples, in which density of a polymer was measured by the sink-float method in a mixed solvent of carbon tetrachloride and n-butyl bromide at 25° C.

EXAMPLE 1

To a reactor of 4 cm in diameter and 20 cm in length equipped with a gas inlet tube, a thermometer and an outlet tube, alkylated diphenyl (Therm S 800 (trade name) of Shin-Nippon Steel Chemical) (49 g) and p-acetoxybenzoic acid (1.0 g) were charged and kept at 100° C. under reduced pressure overnight followed by flashing three times with nitrogen gas.

The reactor was heated in a mantle heater to 330° C. over 25 minutes in a nitrogen gas stream, during which the solution first became homogeneous and then the precipitate gradually formed. Under the same conditions, the reaction was continued for 6 hours followed by cooling. The precipitated product was filtered, washed with acetone five times and dried at 100° C. for 16 hours under reduced pressure to obtain crystalline polymeric whiskers having a maximum diameter of 3.5 μm and a length of about 70 μm. Density of the polymer was 1.51 and amorphous index was 0.7. The thermo gravimetric analysis (temperature raising rate of 10° C./min. in an air stream) revealed that the weight loss started at 348° C. In the differential scanning calorimetric analysis, an endothermic peak was found at 347° C. at a temperature raising rate of 10° C./min. The polymer, however, did not melt when it was kept at a temperature higher than said temperature. When the temperature was decreased at a rate of 10° C./min., an exothermic peak appeared at 323° C. These peaks may be due to dislocation of the crystal and/or the change of polymer orientation.

Figure 2:
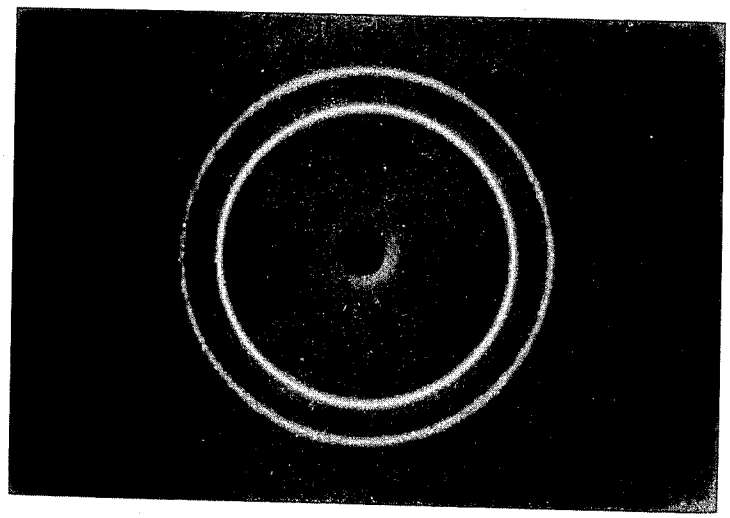
FIG. 2 is an X-ray diffraction Laue's pattern of the crystalline whisker prepared in Example 1.

FIG. 1 is the electron microscope photograph of the whiskers (300×magnification), and FIG. 2 is the X-ray diffraction Laue's pattern of the whiskers. These photographs confirm the high crystallinity of the polymeric whisker.

COMPARATIVE EXAMPLE 1

In the same manner as in Example 1 but using 3.0 g of p-acetoxybenzoic acid and 47.0 g of the solvent, the polymerization and precipitation were carried out to obtain cylindrical polymeric precipitates each having a diameter of about 26 μm and a length of about 16 μm.

Figure 3:
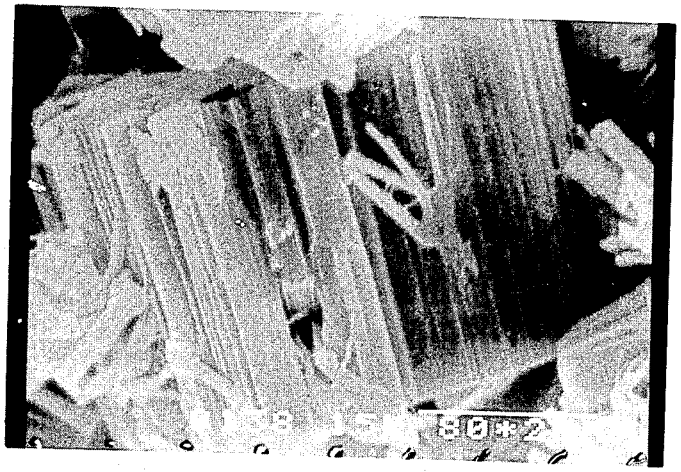
FIGS. 3, 4 and 5 are electron microscope photographs of the crystalline polymers prepared in Comparative Examples 1 (3,750×magnification), 6 (3,000×magnification) and 8 (1,000×magnification), respectively.

FIG. 3 is the electron microscope photograph of the polymer (3,750×magnification).

EXAMPLES 2–5 and COMPARATIVE EXAMPLES 2–4

In the same manner as in Example 1 but using a p-acetoxybenzoic acid in a predetermined concentration, the polymerization was carried out to obtain a polymer precipitate. The shape of the polymer precipitate is shown in Table 1. In Comparative Example 2, the polymer did not precipitate.

TABLE 1

| Example No. | Concentration (wt. %) | Shape of Precipitate | Diameter (μm) | Length (μm) |
|---|---|---|---|---|
| Comp. 2 | 0.15 | — | — | — |
| Ex. 2 | 0.50 | Whisker | ca. 2.0 | ca. 40 |
| Ex. 3 | 1.0 | Whisker | ca. 1.0 | ca. 25 |
| Ex. 4 | 2.0 | Whisker | ca. 3.5 | ca. 70 |
| Ex. 5 | 4.0 | Whisker | ca. 3.0 | ca. 40 |
| Comp. 3 | 6.0 | Cylinder | ca. 26 | ca. 16 |
| Comp. 4 | 11.0 | Cylinder | ca. 30 | ca. 2 |

EXAMPLE 6

In the same manner as in Example 1 but using 4-cyclohexyldiphenyl (Therm S 900 (trade name) of Shin-Nippon Steel Chemical) (49 g), the polymerization was carried out to obtain crystalline polymeric whiskers each having a diameter of about 2.5 pm and a length of 40 μm.

COMPARATIVE EXAMPLE 5

In the same manner as in Example 6 but using 3.0 g of p-acetoxybenzoic acid and 47 g of the solvent, the polymerization was carried out to obtain a cylindrical crystalline polymer having a diameter of 1.5–8 μm and a length of 4–8 μm.

COMPARATIVE EXAMPLE 6

In the same manner as in Example 1 but using 49 g of diphenylsulfone as the solvent, the polymerization was carried out to obtain a cylindrical crystalline polymer having a diameter of about 4 μm and a length of about 7 μm.

Figure 4:
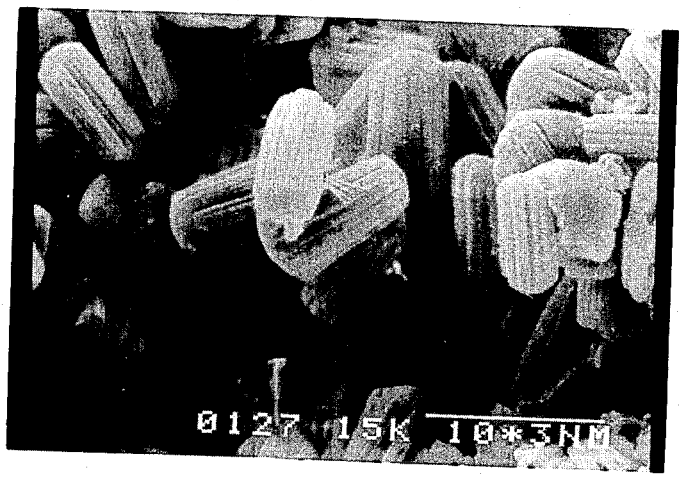

FIG. 4 is the electron microscope photograph of the polymer (3,000×magnification).

EXAMPLE 7

In the same manner as in Example 1 but reacting at 280° C. for 24 hours, the polymerization was carried out to obtain crystalline polymeric whiskers each having a diameter of about 2.5 μm and a length of about 50 μm.

COMPARATIVE EXAMPLE 7

In the same manner as in Example 7 but reacting at 250° C., the polymerization was carried out to obtain a cylindrical crystalline polymer having a diameter of about 15 μm and a length of about 20 pm.

COMPARATIVE EXAMPLE 8

In the same manner as in Example 1 but stirring the reaction mixture at 250 rpm, the polymerization was carried out to obtain a fibril polymer forming pills.

Figure 5:
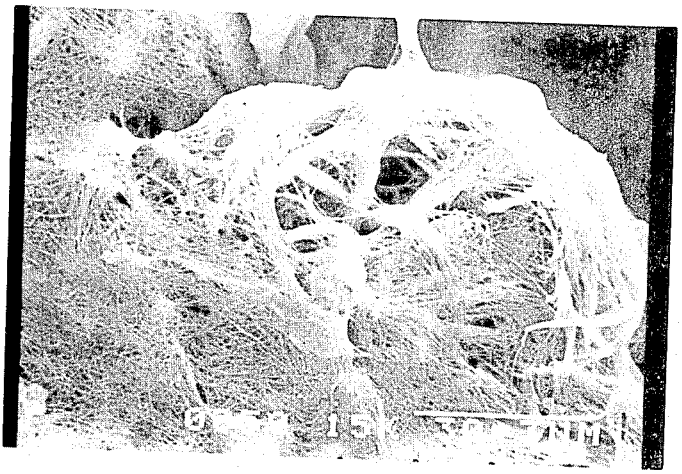

FIG. 5 is the electron microscope photograph (1,000×magnification) of the fibril polymer.

EXAMPLE 8

To the same reactor as use in Example 1, paraffin having a melting point of 48 to 50° C. (49 g) and p-acetoxybenzoic acid (1.0 g) were charged and flashed with nitrogen gas three times.

The reactor was heated in a mantle heater to 330° C. over about 30 minutes in a nitrogen gas stream, during which the reaction mixture was stirred till the temperature reached 210° C. Then, the reaction continued at 330° C. for 6 hours. After cooling the reaction mixture, the precipitated product was filtered, washed with chloroform and dried under reduced pressure to obtain crystalline polymeric whiskers each having a diameter of 1 to 1.5 μm and a length of 20 to 30 μm.

When the whiskers were added in chloroform and treated with ultrasonic, they were well dispersed to chloroform.

EXAMPLE 9

In the same manner as in Example 8 but using p-benzoyloxybenzoic acid (1.3 g) in place of p-acetoxybenzoic acid, the polymerization was carried out to obtain crystalline polymeric whiskers each having a diameter of 1–3 μm and a length of 30–60 μm.

Figure 6:
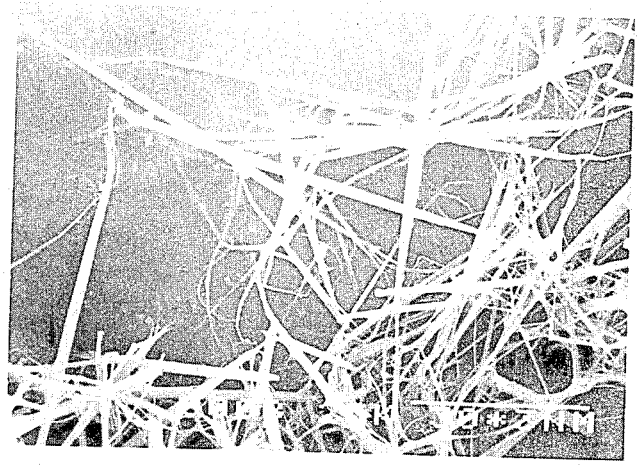
FIG. 6 is an electron microscope photograph (1,000×magnification) of the crystalline polymeric whisker prepared in Example 9.

FIG. 6 is the electron microscope photograph of the whiskers (1,000×magnification).

EXAMPLE 10

In the same manner as in Example 8 but using p-propoyloxybenzoic acid (1.1 g) in place of p-acetoxybenzoic acid, the polymerization was carried out to obtain crystalline polymeric whiskers each having a diameter of 0.6–1.0 μm and a length of 10–15 μm.

EXAMPLE 11

To the same reactor as used in Example 1, alkylated diphenyl (Therm S 800 (trade name) of Shin-Nippon Steel Chemical) (49 g) and 2-acetoxy-6-naphthoic acid (0.9 g) were charged and kept at 100° C. under reduced pressure overnight followed by flashing three times with nitrogen gas.

The reactor was heated in a mantle heater to 330° C. over 25 minutes in a nitrogen gas stream, during which the solution first became homogeneous and then the precipitate gradually formed. Under the same conditions, the reaction continued for 6 hours followed by cooling. The precipitated product was filtered, washed with acetone three times and dried at 100° C. for 16 hours under reduced pressure to obtain crystalline polymeric whiskers having a maximum diameter of 0.3 μm and a length of about 10 μm. The polymer did not melt at 400° C.

Figure 7:
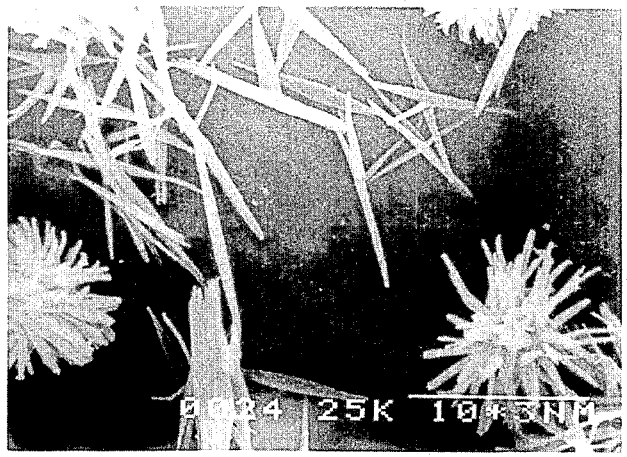
FIGS. 7 and 8 are electron microscope photographs (both 3,000×magnification) of crystalline whiskers of poly(2-oxy-6-naphthoyl) prepared in Examples 11 and 12, respec- tively.

FIG. 7 is the electron microscope photograph of the whiskers (3,000×magnification).

EXAMPLE 12

To the same reactor as used in Example 1, paraffin having a melting point of 48-50° C. (49 g) and 2-acetoxy-6-naphthoic acid (0.9 g) were charged and flashed with nitrogen gas three times.

The reactor was heated in a mantle heater to 330° C. over 25 minutes in a nitrogen gas stream, during which the reaction mixture was stirred till the temperature reached 210° C. Then, the reaction was continued at 330° C. for 6 hours. After cooling, the precipitated product was washed with chloroform and dried under reduced pressure to obtain crystalline polymeric whiskers each having a diameter of 0.5-0.7 μm and a length of 10-15 μm.

Figure 8:
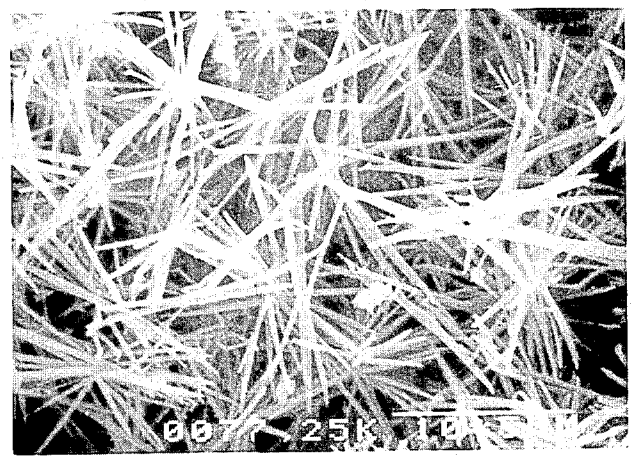
Figure 9:
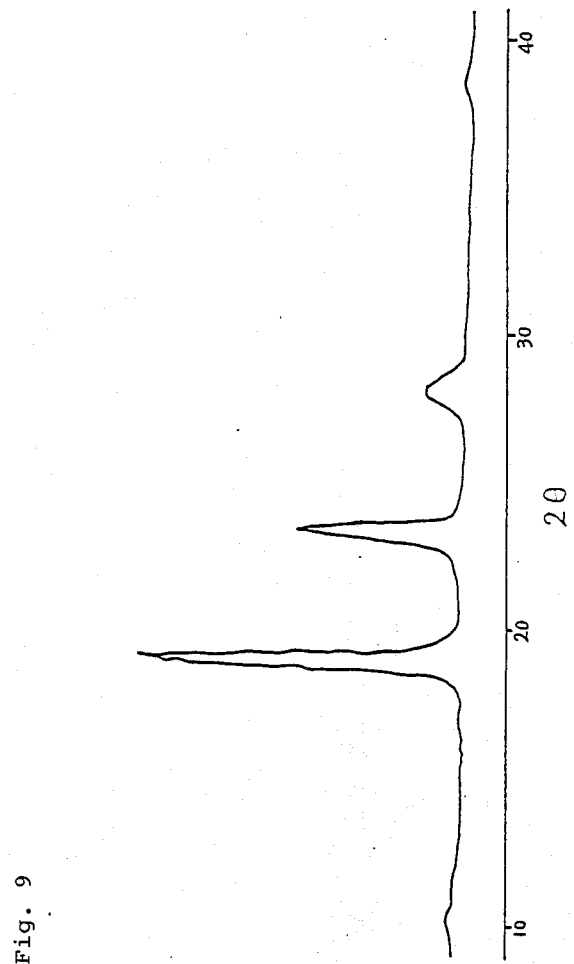
FIG. 9 is an X-ray diffraction pattern of the crystalline polymer prepared in Example 12.

FIG. 8 is the electron microscope photograph of the whisker (3,000x magnification), and FIG. 9 is the X-ray diffraction pattern of the whisker, which indicates that the whisker contains substantially no amorphous portion and has high crystallinity.

EXAMPLE 13

In the same manner as in Example 12 but using 2.0 g of 2-acetoxy-6-naphthoic acid, which corresponded to 2.9% by weight as converted to the polymer weight, the polymerization was carried out to obtain crystalline polymeric whisker having a diameter of about 0.4 μm and a length of 7-12 μm.

COMPARATIVE EXAMPLE 9

In the same manner as in Example 12 but using 3.0 g of 2-acetoxy-6-naphthoic acid, namely 4.4 % by weight of the polymer concentration to be produced, the polymerization was carried out to obtain crystalline polymer aggregates.

Figure 10:
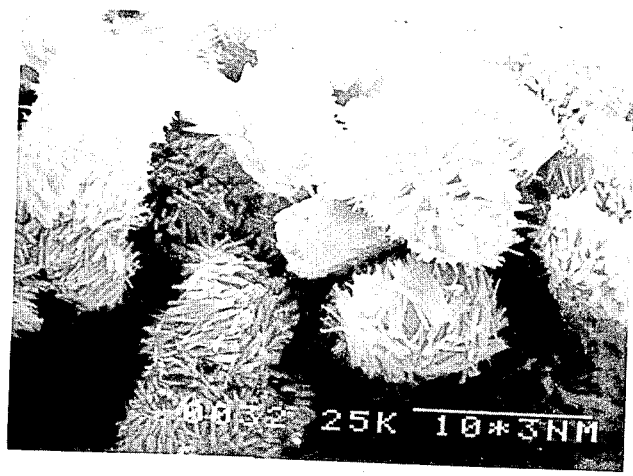
FIGS. 10 and 11 are electron microscope photographs (both 3,000×magnification) of crystalline polymers prepared in Comparative Examples 9 and 10, respectively.

FIG. 10 is the electron microscope photograph of the polymer aggregates (3,000×magnification).

COMPARATIVE EXAMPLE 10

In the same manner as in Example 13 but using 49 g of diphenylsulfone as the solvent, the polymerization was carried out to obtain a crystalline particle polymer which was partially fibrilled.

Figure 11:
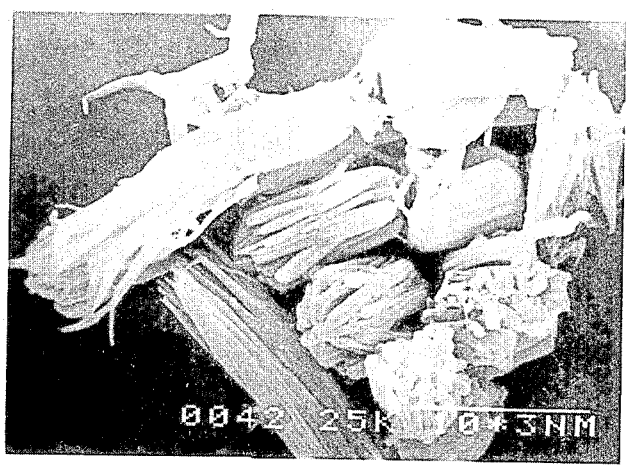

FIG. 11 is the electron microscope photograph of the polymer (3,000×magnification).

EXAMPLE 14

Bisphenol-A and tere- and iso-phthaloyl chloride (molar ratio of 4:6) were reacted by the interfacial polymerization to obtain a wholly aromatic polyester.

On the other hand, to a 200 ml three-neck flask equipped with a stirrer containing 100 ml of chloroform which was dipped in a water bath equipped with an ultrasonic generator, the polymeric whisker (0.5 g) prepared in Example 2 was added and dispersed by the application of ultrasonic with stirring followed by gradual addition of the above produced whole aromatic polymer (1.5 g). After concentrating the solution by evaporation of chloroform, the solution was cast on a polytetrafluoroethylene plate and dried to obtain a sheet. Several sheets were laminated by heat pressing to form a sheet of about 1 mm into thickness and cut in a tape of 5 mm in width and 5 cm in length. Modulus in tension and a heat distortion temperature were measured by a Tensilon tester and a thermomechanical property tester, respectively. The heat distortion temperature was measured in the air by raising the temperature at a rate of 10° C./min.

For comparison, the same sheet was produced from the wholly aromatic polyester alone and its modulus in tension and heat distortion temperature were measured.

The results are shown in Table 2.

TABLE 2

| | Whisker amount (wt. %) | Heat distortion Temperature (°C.) | Modulus in tension (GPa) |
| --- | --- | --- | --- |
| Comparative | 0 | 213 | 1.6 |
| Example 14 | 25 | 264 | 3.4 |

From the examination of the broken surface of the sheet of Example 14 after measurement of modulus in tension, it was found that the adhesivity of the polymeric whisker with the matrix polymer was not sufficient. However, the polymeric whisker of the invention still has good reinforcing characteristics and it is estimated that the modulus of the whisker itself is about 32 GPa from the above results.

What is claimed is:

1. A crystalline polymeric whisker comprising repeating units derived from a compound selected from the group consisting of p-oxybenzoyl and 2-oxy-6-natphthoyl, said whisker having a length (L) of 6 to 200 μm, a diameter (D) of 0.2 to 5 μm and an L/D ratio of not less than 10.

2. A crystalline polymeric whisker according to claim 1, which comprises repeating units derived from a p-oxybenzoyl compound of the formula:

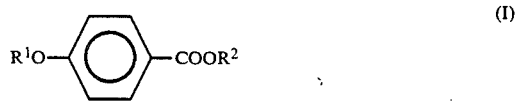

(I)

wherein $R^1$ is a hydrogen atom or a group of the formula:

which $R^3$ is a $C_1$-$C_4$ alkyl group or a phenyl group optionally substituted with 1 to 3 methyl groups and $R^2$ is a hydrogen atom or a phenyl group optionally substituted with 1 to 3 methyl and/or ethyl groups with the proviso that one of $R^1$ and $R^2$ is a hydrogen atom and the other of them is not hydrogen atom.

3. A crystalline polymeric whisker according to claim 2, wherein the p-oxybenzoyl compound is one selected from the group consisting of p-acetoxybenzoic acid, p-propoyloxybenzoic acid, p-benzoyloxybenzoic acid, p-toluyloxybenzoic acid, phenyl p-hydroxybenzoate and cresyl p-hydroxybenzoate.

4. A crystalline polymeric whisker according to claim 3, wherein the p-oxybenzoyl compound is p-acetoxybenzoic acid.

5. A crystalline polymeric whisker according to claim 1, which comprises repeating units derived from a 2-oxy-6-naphthoyl compound of the formula:

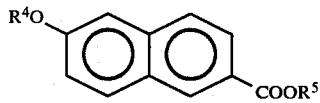
(II)

wherein $R^4$ is a hydrogen atom or a group of the formula:

$R^6-CO-$ which $R^6$ is a $C_1-C_4$ alkyl group or a phenyl group optionally substituted with 1 to 3 methyl groups and $R^5$ is a hydrogen atom or a phenyl group optionally substituted with 1 to 3 methyl and/or ethyl groups with the proviso that one of $R^4$ and $R^5$ is a hydrogen atom and the other of them is not a hydrogen atom.

6. A crystalline polymeric whisker according to claim 5, wherein the 2-oxy-6-naphthoyl compound is one selected from the group consisting of 2-acetoxy-6-naphthoic acid, 2 propoyloxy-6-naphthoic acid, 2-benzoyloxy-6-naphthoic acid and 2-toluyloxy-6-naphthoic acid.

7. A crystalline polymeric whisker according to claim 6, wherein the 2-oxy-6-naphthoyl compound is 2-acetoxy-6-naphthoic acid.

8. A crystalline polymeric whisker according to claim 2, wherein an amorphous index of the polymer is not larger than 2.0.

9. A process for preparing a crystalline polymeric whisker according to claim 1, which comprises adding a p-oxybenzoyl compound of the formula:

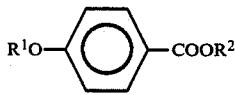
(I)

wherein $R^1$ is a hydrogen atom or a group of the formula:

$R^3-CO-$ which $R^3$ is a $C_1-C_4$ alkyl group or a phenyl group optionally substituted with 1 to 3 methyl groups and $R^2$ is a hydrogen atom or a phenyl group optionally substituted with 1 to 3 methyl and/or ethyl groups with the proviso that one of $R^1$ and $R^2$ is a hydrogen atom and the other of them is not a hydrogen atom, or a 2-oxy-6-naphthoyl compound of the formula:

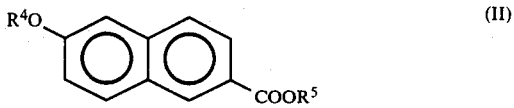
(II)

wherein $R^4$ is a hydrogen atom or a group of the formula:

$R^6-CO-$ in which $R^6$ is a $C_1-C_4$ alkyl group or a phenyl group optionally substituted with 1 to 3 methyl groups and $R^5$ is a hydrogen atom or a phenyl group optionally substituted with 1 to 3 methyl and/or ethyl groups with the proviso that one of $R^4$ and $R^5$ is a hydrogen atom and the other of them is not a hydrogen to a solvent which is unreactive with the compound (I) or (II) and in which the produced polymer is hardly or not soluble in a concentration of 0.3 to 4.5% by weight as converted to the polymer weight, and then polymerizing the compound (I) or (II) at a temperature not lower than 265° C. without stirring or with stirring at a low rate.

10. A process according to claim 9, wherein the solvent has a boiling point not lower than 270° C.

11. A process according to claim 10, wherein the solvent is one selected from the group consisting of diisopropylnaphthalene, diethylnaphthalene, ethylisopropylnaphthalene, cyclohexyldiphenyl and diethyldiphenyl.

12. A process according to claim 10, wherein the solvent is paraffin having a boiling point of not lower than 270° C.

13. A process according to claim 9, wherein the solvent has a flow point not lower than 190° C.

14. A process according to claim 9, wherein the reaction temperature ranges from 275 to 350° C.

15. A process according to claim 9, wherein the polymerization is carried out without stirring.

16. A process according to claim 9, wherein the polymerization is carried out with stirring at a rate not larger than 20 rpm.

* * * * *

UNITED STATES PATENT AND TRADEMARK OFFICE
CERTIFICATE OF CORRECTION

PATENT NO. : 4,673,724

DATED : June 16, 1987

INVENTOR(S) : SEIJI ENDOH ET AL

It is certified that error appears in the above-identified patent and that said Letters Patent is hereby corrected as shown below:

Claim 1 (column 8, line 48), "natphthoyl" should be --naphthoyl--;
Claim 5 (column 9, line 27), before "which" insert --in--;
Claim 9 (column 10, line 6), before "which" insert --in--.

Signed and Sealed this

First Day of September, 1987

*Attest:*

DONALD J. QUIGG

*Attesting Officer*  *Commissioner of Patents and Trademarks*